Jan. 12, 1926.
H. J. ROBINSON
1,569,143.
AUTOMOBILE BRAKE
Filed Nov. 14, 1923
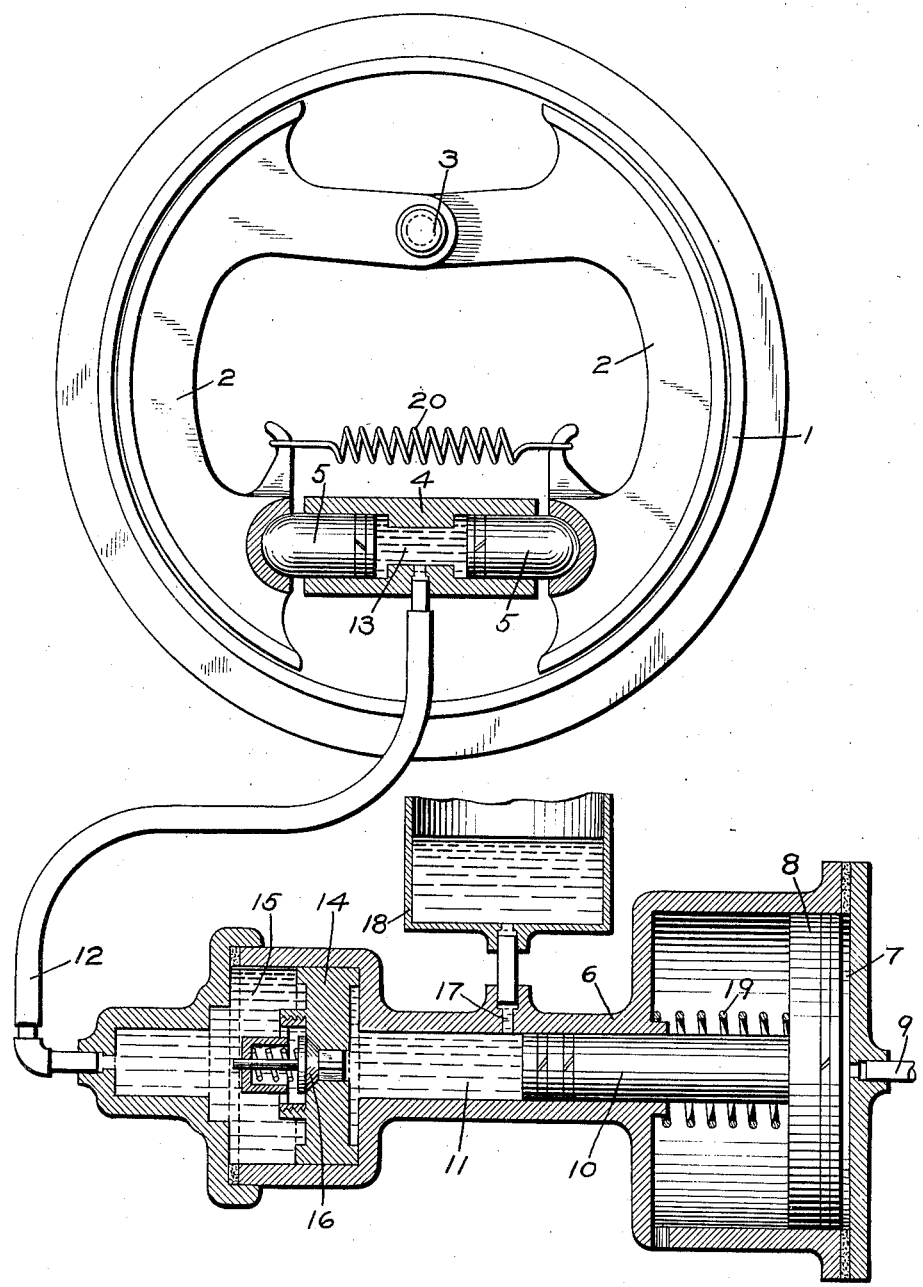
INVENTOR
HENRY J. ROBINSON
BY *Wm. M. Cady*
ATTORNEY Patented Jan. 12, 1926.

1,569,143

UNITED STATES PATENT OFFICE.

HENRY J. ROBINSON, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOBILE BRAKE.

Application filed November 14, 1923. Serial No. 674,666.

*To all whom it may concern:*

Be it known that I, HENRY J. ROBINSON, a citizen of the United States, residing at East McKeesport, in the county of Allegheny and State of Pennsylvania, have invented new and useful Improvements in Automobile Brakes, of which the following is a specification.

This invention relates to a brake equipment in which compressed air or other fluid is employed to transmit power through a liquid to a brake mechanism, and more particularly as adapted for use on a motor vehicle.

The principal object of my invention is to provide an improved power brake of the above character.

In the accompanying drawing, the single figure is a diagrammatic view, partly in section, of an automotive brake equipment embodying my invention.

The drawing illustrates the construction as applied to only one wheel of a motor vehicle, but it will be understood that the brake may be applied to all four wheels or only to the two rear wheels, as desired.

On each wheel to be braked there is provided a brake drum 1 having an internal friction face and brake heads 2, pivotally connected together by pin 3, and having arcuate faces adapted to engage the friction face of the drum 1. Interposed between the expandable ends of the brake heads 2 is a cylindrical casing 4 containing oppositely facing round nosed pistons 5 adapted to engage hollows provided in the brake head ends, as shown.

The pistons 5 are adapted to be operated by pressure transmitted through a liquid and the controlling mechanism may comprise a casing 6 having an enlarged piston chamber 7 containing a piston 8, one side of said piston being open to a pipe 9, through which fluid under pressure is supplied to and released from the piston.

At the opposite side, the piston 8 carries an extended piston 10 of reduced area, which acts on a body of liquid contained in the piston chamber 11. Interposed between the piston chamber 11 and a flexible tube 12 through which liquid pressure is transmitted to chamber 13 intermediate the pistons 5, is a piston or movable abutment 14 having a movement limited by engagement of the piston with the end walls of piston chamber 15. In said piston is a check valve 16 adapted to permit flow through the piston from piston chamber 11 to piston chamber 15. When piston 8 is in release position, as shown in the drawing, the piston 10 uncovers a port 17 leading to a reservoir or chamber 18, so that communication is established from the reservoir to piston chamber 11.

The reservoir 18 is supplied with liquid, which flows into piston chamber 11 and in operation, if it is desired to effect an application of the brakes, fluid under pressure is supplied by any suitable means through pipe 9 to piston 8. Said piston is thereupon shifted toward the left and piston 10 then forces the liquid in piston chamber 11 to the left, so that piston 14 is also moved until said piston engages the left hand end wall of piston chamber 15.

Further movement of piston 10 then causes the pressure of the liquid in chamber 11 to open the check valve 16, permitting the flow of liquid from chamber 11 to piston chamber 15 and thence through the flexible tube 12 to chamber 13. The pressure of liquid supplied to chamber 13 then moves the piston 5 outwardly, so as to expand the brake heads 2 into frictional engagement with the brake drum 1.

In order to release the brakes, fluid under pressure in the piston chamber 7 is exhausted through pipe 9 and piston 8 is returned to release position by the action of spring 19. As piston 10 moves toward the right, the piston 14 will also move toward the right until the same engages the right hand end wall of the piston chamber 15. The relief of pressure on the liquid in chamber 13 permits the spring 20 to return the brake heads 2 and the pistons 5 to normal release position, thus effecting the release of the brakes.

When piston 10 has moved to the right sufficiently to uncover the port 17, liquid is supplied from reservoir 18 to fill the space between the piston 10 and the piston 14.

As the brake heads 2 wear by frictional engagement with the brake drum 1, the brake heads 2 and the pistons 5 will move out farther when the brakes are applied and in such case, when the piston 14 has moved to its left hand seat in applying the brakes, the increased movement of the pistons 5 required to effect frictional engagement of the brake heads 2 with the brake drum 1 is compensated for, since liquid will then be forced past the check valve 16 from piston chamber 11 to piston chamber 15. When the piston 10 is then returned to release position, any loss of liquid from chamber 11, due to flow past the check valve 16, is made up by flow from reservoir 18 to piston chamber 11.

It will thus be seen that the construction described acts as a slack adjuster, to maintain the stroke of the operating piston 8 substantially constant, regardless of wear of the brake heads.

Having now described my invention, what I claim as new and desire to secure by Letters Patent, is:—

1. In a braking mechanism, the combination with a brake piston operated by pressure transmitted through a body of liquid for applying the brakes, of a piston acting on said body of liquid to apply pressure thereto, and a piston operatively connected to said liquid pressure transmitting piston through a column of liquid and operated by fluid under pressure.

2. In a braking mechanism, the combination with a brake actuating means operable by pressure transmitted through a column of liquid and a piston for applying pressure to said liquid column, of a movable abutment interposed in said column between the brake actuating means and said piston, a one-way passage being provided for permitting flow of liquid from the pressure applying piston side of said abutment to the other side.

3. In a braking mechanism, the combination with a brake actuating means operable by pressure transmitted through a column of liquid and a piston for applying pressure to said liquid column, of a movable abutment interposed in said column between the brake actuating means and said piston and having a passage for permitting flow of liquid from the pressure applying piston side of said abutment to the other side, and means for preventing back flow through said passage.

4. In a braking mechanism, the combination with a brake actuating means operable by pressure transmitted through a column of liquid and a piston for applying pressure to said liquid column, of a movable abutment interposed in said column between the brake actuating means and said piston and having a one-way passage for permitting flow of liquid from one side of the abutment to the other, and a reservoir containing liquid and communicating with the column of liquid at a point intermediate said piston and said movable abutment.

5. In a braking mechanism, the combination with a brake drum and brake heads for engaging said brake drum, of a casing, oppositely facing pistons mounted in said casing and adapted to engage said brake heads, a piston for applying pressure to a column of liquid acting on said oppositely facing pistons, and a piston operatively connected to said pressure applying piston through a column of liquid and operated by fluid under pressure for actuating said pressure applying piston.

In testimony whereof I have hereunto set my hand.

HENRY J. ROBINSON.